US006621829B1

(12) United States Patent
Achilles et al.

(10) Patent No.: US 6,621,829 B1
(45) Date of Patent: Sep. 16, 2003

(54) METHOD AND APPARATUS FOR THE PRIORITIZATION OF CONTROL PLANE TRAFFIC IN A ROUTER

(75) Inventors: Heather Achilles, Hudson, NH (US); Terry Pearson, Hollis, NH (US); Paul Gallo, Newton, MA (US); Tom Colley, Groton, MA (US); Dan Sullivan, Hopkinton, MA (US); Bill Miller, Groton, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/314,567

(22) Filed: May 19, 1999

Related U.S. Application Data

(60) Provisional application No. 60/086,078, filed on May 20, 1998.

(51) Int. Cl.[7] ............................ H04L 12/56; H04T 3/16

(52) U.S. Cl. ....................... 370/468; 370/235; 370/389; 370/395.1

(58) Field of Search ................................ 370/351, 389, 370/395.1, 395.5, 395.51, 395.52, 395.6, 395.7, 395.71, 360, 392, 464–468, 235; 359/109, 115, 142, 147; 348/461–468

(56) References Cited

U.S. PATENT DOCUMENTS

| | | | | |
|---|---|---|---|---|
| 5,537,400 | A | * | 7/1996 | Diaz et al. |
| 5,732,080 | A | * | 3/1998 | Ferguson et al. |
| 5,781,532 | A | | 7/1998 | Watt |
| 6,091,728 | A | * | 7/2000 | Larzraq et al. |
| 6,104,700 | A | | 8/2000 | Haddock et al. |
| 6,188,698 | B1 | | 2/2001 | Galand et al. |
| 6,222,844 | B1 | | 4/2001 | Han et al. |
| 6,249,530 | B1 | * | 6/2001 | Blanco et al. |

* cited by examiner

*Primary Examiner*—William A. Luther
(74) *Attorney, Agent, or Firm*—Blakely Sokoloff Taylor & Zafman LLP

(57) ABSTRACT

A method, apparatus and article of manufacture for prioritization of control plane traffic in a router. A destination slot is allocated in a sliding window buffer via a control channel. A data packet is received via a data channel. An acknowledgement that the data packet was received is sent via the control channel. The destination slot is released via the control channel.

20 Claims, 5 Drawing Sheets

CPU
DMA 103
DMA 105
101
107
109
FWD 111
FWD 113

METHOD AND APPARATUS FOR THE PRIORITIZATION OF CONTROL PLANE TRAFFIC IN A ROUTER

CROSS-REFERENCES TO RELATED APPLICATIONS

This application claims the benefit of U.S. Provisional Application No. 60/086,078 entitled "Big Access Concentrator" filed May 20, 1998.

FIELD OF THE INVENTION

This invention relates generally to computer networks, and more particularly, to a method and apparatus for the prioritization of control plane traffic in a router.

BACKGROUND OF THE INVENTION

In the field of data routing in computer networks, an Internet service provider (ISP) user typically has much more stringent requirements than an enterprise user because the routers will be subjected to the adverse Internet routing environment in the world. There are three typical architectural requirements that such routers must support, described below.

A. Stable Operation. Although it sounds trivial, the notion of stable operation has been elusive in the ISP community, as witnessed by various Internet "brown-outs" since it's inception. One paper on Internet scaling "Scaling the Internet during the T3 NSFNET Years", C. Villamizar, Oct. 22, 1997, articulates the basic requirements which ISPs demand from their networking equipment in order to provide a stable network. In addition to forwarding performance and scaling requirements, ISPs typically expect several operational attributes, given below.

1. Stability under adverse conditions. The router must remain stable and deterministic under arbitrarily high traffic loads or a flood of routing update changes.
2. Low packet loss to stable destinations. The effects of unstable routes (flapping) should not impact a router's ability to forward traffic to stable routes.
3. Reasonable fairness and congestion control. Sufficient buffering capacity, avoidance of head-of-line blocking, advanced queueing algorithms, and sophisticated discard techniques must be provided.

B. Service Differentiation. Recently it has become clear that service providers cannot make adequate margins by offering flat-rate access and undifferentiated service. The ability to offer tiered services, and to guarantee service levels, is crucial to the economic and competitive health of ISPs. The airline industry's first-class, business-class and coach-class offerings provide a meaningful analogy for Internet service differentiation: a small number of customers are willing to pay for premium service, if it can be guaranteed. The concentrator's must enable ISPs to offer differentiated services based on multiple queues and advanced, intelligent Traffic Management features.

C. Superior Reliability. ISP routers must provide a greater level of reliability and availability than known router architectures. Part of this flows from designing with stability in mind, but providing additional fault tolerance features adds another dimension of resiliency. ISP routers should be designed without any single points of failure, and all software designs should incorporate fault isolation principles.

Therefore, there is a need for a way to route data in computer networks that provides stable operation, service differentiation, and superior reliability. Such an invention should be stable under adverse conditions, insure low packet loss to stable destinations, and provide reasonable fairness and congestion control.

SUMMARY OF THE INVENTION

The present invention provides a method, apparatus and article of manufacture for prioritization of control plane traffic in a router. A destination slot is allocated in a sliding window buffer via a control channel. A data packet is received via a data channel. An acknowledgement that the data packet was received is sent via the control channel. The destination slot is released via the control channel.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

Figure 1:
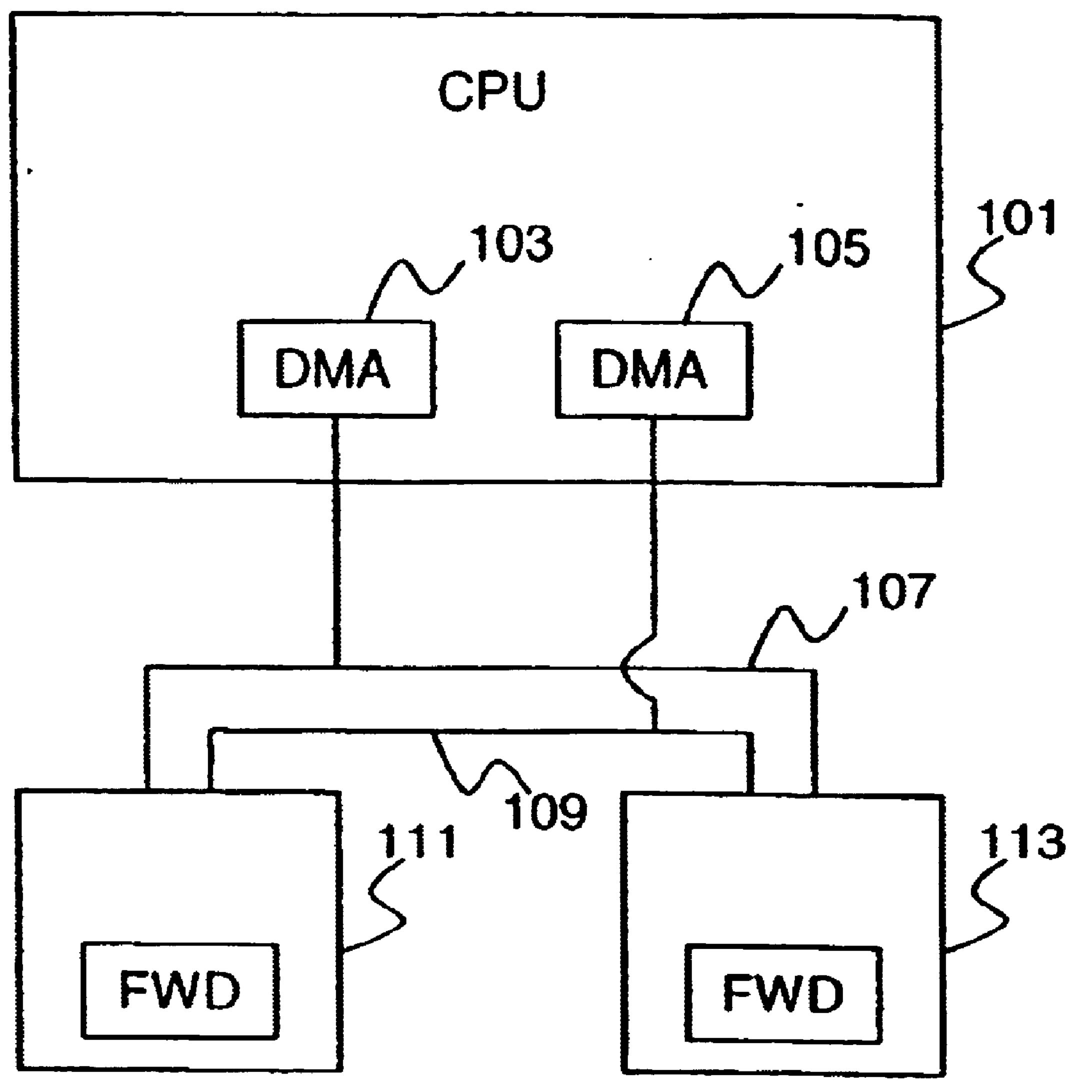
FIG. 1 is a block diagram of an architecture for prioritization of control plane traffic in a router compatible with the present invention.

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the disclosed technology. A preferred embodiment of the disclosed technology, described below, enables a remote computer system user to execute a software application on a network file server.

Modern routing systems must remain stable and demonstrate deterministic behavior under adverse traffic conditions. The disclosed technology provides traffic prioritization where routing control functions and management protocols are exchanged over one or more router network interfaces. As described in greater detail below, a data plane of the router relays data packets between receive and transmit network interface ports. The control plane runs the routing algorithms. Two separate PPX paths are used for control and data flows. Control traffic and data traffic are carried on separate, dedicated interconnect to avoid the adverse effects of mixing different traffic streams on the same bus. Control and data flows do not share a pool of common buffers so when the system is busy passing large volumes of data, dedicated buffers are still available for control messaging.

The disclosed technology also provides a reliable transport mechanism, typically in software, to ensure delivery of control messages across the system. Control flows are interprocess communications that occur between software entities in the system. These communications are effected via message passing services. A reliable transport is implemented to ensure delivery of control messages. The reliable transport employs a sliding window protocol between each pair of slots as follows. If a sending slot transmits a buffer over the interconnect, there is no guarantee that the destination slot will have a message buffer to receive it into. This lack of buffer resources restricts reliable messaging, performance when the system is congested. The presently described sliding window scheme allows sending slots to ensure that each destination slot will have enough buffer resources to receive the messages transmitted. A sending slot is allowed to send up to N messages to each remote slot. When the sender transmits a message, it allocates an entry for the message in a sliding window table. The table is typically a fixed size, so each message requires one "transmit credit". The receiving slot sends acknowledgements to the sender for each message or group of messages successfully received. When the sender receives this acknowledgement (ACK), it releases the message's entry in the sliding window table, replenishing transmit credits. Since the sender can have only N outstanding messages in transit, the acknowledgement mechanism serves as the receiver's back-pressure mechanism.

The disclosed technology provides a method, apparatus and article of manufacture for prioritization of control plane traffic in a router. A destination slot is allocated in a sliding window buffer via a control channel. A data packet is received via a data channel. An acknowledgement that the data packet was received is sent via the control channel. The destination slot is released via the control channel.

FIG. 1 shows an example architecture for prioritization of control plane traffic in a router. A routing system 101 typically contains a first direct memory address (DMA) controller 103, 105 that communicates with routing systems 111, 113 via a bus having a control channel 107 and a data channel 109.

Figure 2:
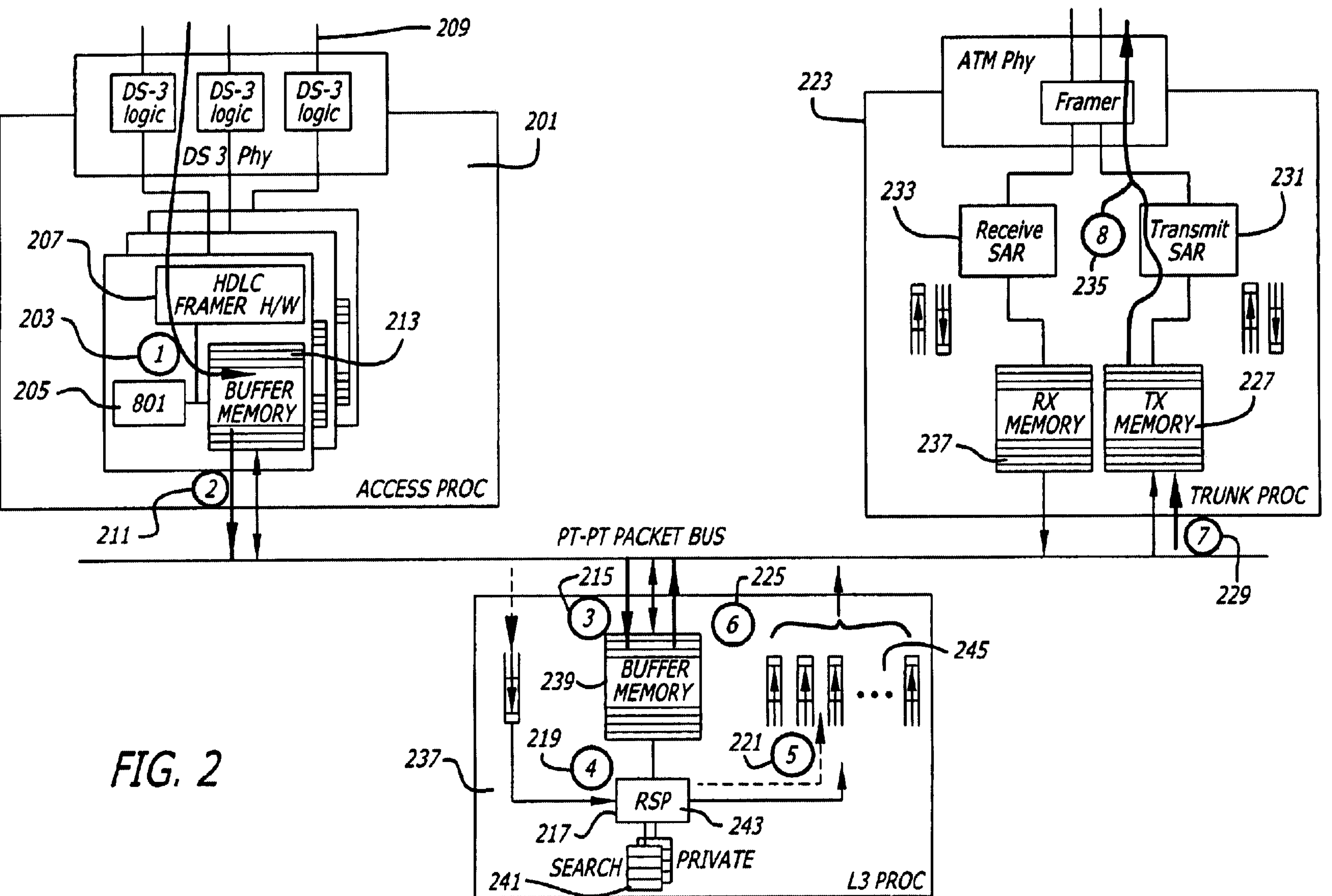
FIG. 2 shows a flow diagram of router packet forwarding compatible with the present invention.

FIG. 2 depicts an example flow of data packets through an embodiment of the disclosed technology. An Access Processor Card 201 receives a multiplexed stream of data frames on each of it's six DS-3 interfaces 209. Each aggregate DS-3 stream is broken into component DS-1 and DS-0 streams by the T1 framer and HDLC controller hardware 207, based on the line's configuration. The hardware supports up to 256 logical channels per access card, which allows the user to support up to 92 DS-0s and 164 DS-1s in the most fragmented case. Frames are typically written into buffer memory 213 via a direct memory access (DMA) by the HDLC controller 207 as they are received (see legend 203). The buffer memory 213 is managed by a manager 205 and is segmented such that each logical channel has fair access to its share of buffers. Once a frame has been buffered, the manager 205 writes a descriptor to the DMA engine, which transfers the frame to a L3 Processor 237 (see legend 211). A board/channel identifier accompanies the frame to the L3 processor 237.

As the frame arrives at an input port of the L3 processor 237, the DMA hardware stores it in buffer memory 213, and generates a descriptor in an input FIFO 241 for a route switch processor (RSP) 217 (see legend 215). Up to 20 bytes of the IP header is actually copied to the descriptor so the RSP 217 doesn't have to access the buffer memory 239 under normal forwarding conditions. The RSP 217 forwarding streams poll the input FIFO 241, and when the read operation delivers a valid descriptor, the forwarding process begins. Each frame makes its way through the pipework of forwarding microcode where operations like classification, filtering, policing, and IP routing are performed on the frame (see legend 219). At the end of this process the frame's destination IP interface and priority are known, and an output descriptor is written to the appropriate destination queue (245 see legend 221). Normally, traffic received on the Access Processor 201 will be forwarded out a trunk interface. In the case of an ATM trunk card 223, the outbound descriptor contains a destination CID, which represents an ATM Virtual Channel (VC), over which an IP interface and type of service are configured. The L3 processors DMA hardware transfers the frame to the ATM trunk card 223 by reading header data from the descriptor and the body of the frame from the buffer memory (see legend 225).

The ATM trunk card 223 DMA engine sees the incoming frame, and uses a DMA transfer to send it to local buffer memory, and posts a descriptor to the Transmit SAR (see legend 229). The SAR 231 reads the descriptor and uses the CID to queue the frame to the appropriate VC. An intelligent, per-VC queueing and scheduling scheme ensures fair access to local buffer memory and link bandwidth. The Transmit SAR 231 segments the frame into 48-byte cells, and transmits each one whenever the VC is eligible to transmit (see legend 235).

Traffic flowing from a Trunk Access card 223 to an Access Process card 201 goes through a similar process, but the transmit and receive roles are reversed. The ATM trunk card 223 receives a stream of ATM cells which are reassembled in local buffer memory into their original frame format. The Receive SAR 233 hands the trunk DMA engine a descriptor, and the frame is transferred to the L3 processor 237. The source CID is carried with the frame and indicates which ATM VC the frame was received on. The RSP 217 opens the packet, makes a forwarding decision, and queues the frame to the destination card. The L3 DMA engine ships the frame to the appropriate Access Processor 201, where it is stored in buffer memory 213. Transmit buffer memory 213 on the Access Processor 201 is segmented per-channel and per-queue, so that fairness is guaranteed. The manager 205 services the output queues using a weighted round-robin algorithm and hands the frame to the HDLC controller. On output, the hardware merges the individual, per-channel frame streams into a single aggregated, multiplexed DS-3 stream 209.

Control Flows

A message-passing service which facilitates communication between software entities allows clients and servers to exchange messages "locally" when the entities are running on the same physical slot, or "remotely" across the system interconnect when the client and server are running on different slots. An embodiment of the disclosed technology provides at least three distinct message-passing transport services:

Unreliable—A high performance, unreliable transport mechanism is typically used to pass network packets between gates. Optimized to meet the fast forwarding requirements of the data path. System calls: g_xmt(), g_fedex().

Reliable Unidirectional—A pending, guaranteed-delivery service which allows one gate to send a message to another gate without waiting for a reply message. The caller is unpended when the message has been delivered to the destination gate. System call: g_fwd().

Reliable Request/Response—A pending, guaranteed-delivery service which allows one gate to send a request message to another gate and wait for a corresponding reply message. System calls: g_rpc(), g_reply().

In general, the unreliable service is used to pass network payload data units (PDUs) through the system because their delivery does not need to be guaranteed. This unreliable data service unsplices the buffers that are being transmitted, and delivers them to either a gate (in the local case) or the backbone driver (in the remote case). The reliable transport services are typically used by applications to send internal control messages, whose delivery must be guaranteed, between gates. GAME ensures reliable delivery by implementing a dynamic sliding window protocol, with acknowledgments, retransmit buffers/timers, and sequence numbers, between each pair of slots.

Another embodiment of the disclosed technology implements the same three classes of message-passing service through a different communication model. The communication model is implemented as a single-slot device, so the issue of inter-slot communication can be ignored. All messaging happens locally, either between gates on the host processor or between host gates and Switch Node Module (SNM) VISAs. When PDUs are passed between applications on the Host and VISAs on the SNMs, the Host-to-Switch Frame Interface (HSFI) is used to transport the data. The Driver Control Interface (DCI) is used by the SCD and host drivers (xHDs) to reliably pass control messages between the host and SNMs. The DCI provides both a unidirectional, g_fwd-like, reliable transport and a g_rpc-like, request/response transport. The low-level, physical, message passing is prferably implemented via shared memory, command rings, and interrupts. Communication between the host and SNMs is inherently reliable due to this shared memory implementation, and the chore of ensuring reliable transmission and reception is greatly simplified in comparison to GAME's sliding window protocol.

An embodiment of the disclosed technology uses the messaging services given below.

1. External Control Messages. Applications running on the host send and receive packets through any network interface.
2. Internal Control Messages. Host-based applications are be able to send and receive control messages to the Access, Trunk and Layer 3 processor cards. Reliable and unreliable inter-process communication primitives are also be supported between the CPRs.

Packet Generation

Figure 3:
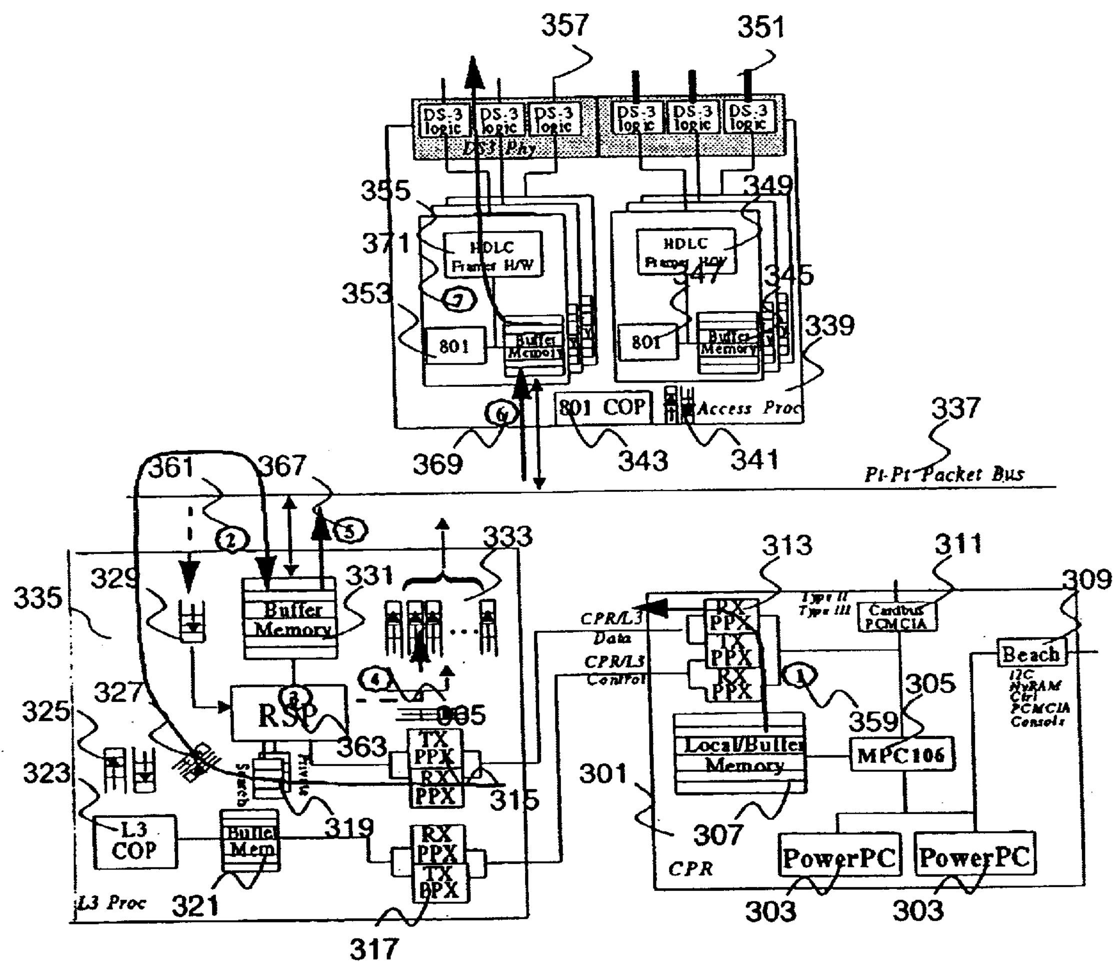
FIG. 3 shows a flow diagram of router packet generation compatible with the present invention.

Applications running on the CPR host require the ability to communicate with entities running in the forwarding path. This communication channel is implemented by the HSFI (Data) interface, which is carried forward to the concentrator, as shown in FIG. 3. From an application perspective, the interface for sending these messages remain essentially the same, but the underlying transport differs significantly because the shared memory command rings have been replaced by a Parallel Packet Express (PPX)-based interconnect. Applications build messages and invoke one of the HSFI system calls to transmit the data. The Host Interface Driver (HID) receives the message and formats it for transmission by preparing a destination slot mask and VISA for the trip over the PPX. The destination VISA is passed as part of the system call, but the slice mask must be calculated by the HID, based on the SCD's instantiation information.

Data packets orginate on a routing system 301, for example, from end user sites 303, an external beach 309, or a cardbus PCMCIA slot 311. Once the formatting is complete, the HID is required to transfer the message via a Motorola® controller MPC106 305 to it's associated L3 Processor. The message is transferred to the PPX driver 313, which sends a copy from local host memory 307 (see legend 569). The frame travels across the PPX to the destination L3 Processor, L3P 335, where receive PPX chip 315, 317 copies the data packet memory 321, 331 and posts a descriptor to the input FIFO 319 for a RSP 363 (see legend 361). Descriptors for outbound data frames have a pass-through bit set which indicates that the RSP 363 should simply forward the frame. The RSP 363 generates a descriptor for the frame and posts it to the outbound queue 333 (see legend 365). From there the frame is treated much like any other transmitted packet. At 367, the L3 Processor 335 initiates a DMA to the outbound Access 341 or HDLC framer 349, 355 and the outbound card buffers and transmits the frame via DS-3 interfaces (see legend 371).

Packet Consumption

Figure 4:
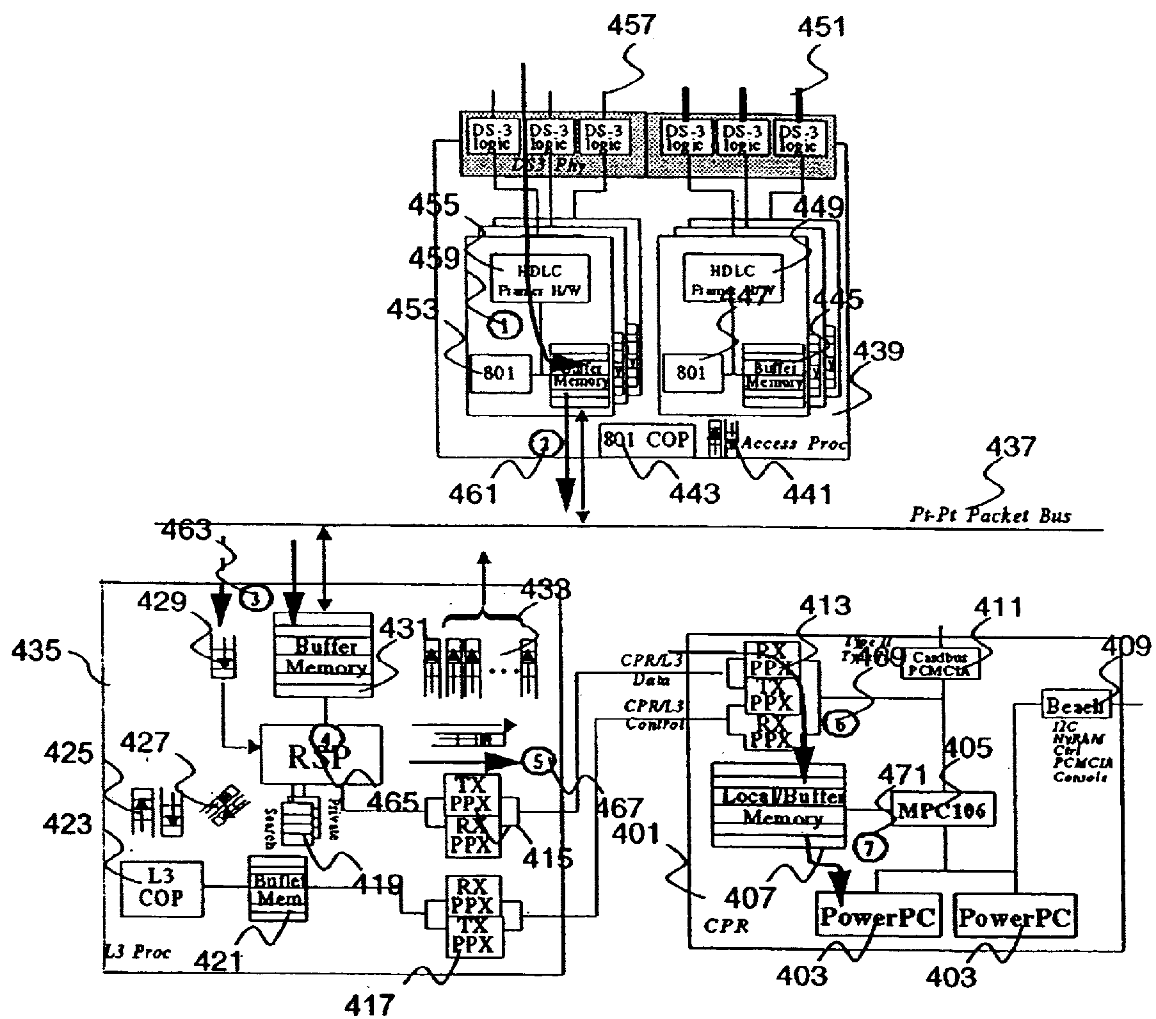
FIG. 4 shows a flow diagram of router packet consumption compatible with the present invention.

As shown in FIG. 4, external control frames enter the system through the same architecture as described in FIG. 3. The external control frames arrive at one of the input ports 451, 457 for the access processor 401 and travel through HDLC controllers 449, 455 from buffer memory 445, and are sent from a DMA 801 COP controller 443 to the L3 Processor 435 buffer memory 431 of the L3 Processor. From buffer memory 431, the control frames travel via RSP 465 to the PPX 415, 417. The RSP 465 binds the control packet to a data port on a host routing system, and formats the data buffers for transmission through the L3 Processor 435. The format of the data buffers is the same in both directions, so the L3 Processor 435 must prepare a slot mask and VISA to prepare the control frame for transmission over the PPX 415, 417. The slot mask indicates that the message is destined for the controlling CPR 421, where each CXP must be given the CPR 421 slot number at init time. The CXP posts a descriptor to the PPX-controlled CPR 421 queue, and the PPX DMAs the frame to the PPX 413 (see legend 467). The PPX 413 receiver recognizes that the message has been received, and transmits via a DMA the frame into a local buffer 407. All data traffic received on the PPX 413 receiver is handled by the HID, which takes the VISA information and derives a gate handle from the instantiation information located in the control packet. Finally, the HID delivers the frame to the destination gate (see legend 472), and from there, for example, to end user sites 403, an external beach 409, or a cardbus PCMCIA slot 411.

Reliable Transport Summary

One embodiment of the disclosed technology implements a TCP-like sliding window protocol between each pair of slots. This addresses the reliable messaging impediments through one or more of the functions described below.

Positive Acknowledgements (ACK)—Sent from the receiver back to the sender to indicate that frames have been received successfully. The sender uses a positive ACK to advance it's sliding window table, and essentially, acquire more buffer credits for transmit.

Negative Acknowledgements (NAK)—Sent from the receiver back to the sender to indicate that an error occurred. This quick feedback allows the sender to retransmit one or more frames without waiting for a timer to fire.

Piggybacking—The receiver's ACKs/NAKs will be piggybacked onto other outbound reliable message traffic, to conserve interconnect and processing bandwidth.

Retransmit Buffers/Timers—Implemented in the sender so that messages can be retransmitted whenever the frame, or an ACK/NAK, are lost.

Sequence Numbers—Used to filter out duplicate messages which may be transmitted by the sender.

Go-back-N Error Recovery—Based on the assumption that messaging failures are rare. A more complicated, selective NAK with receiver re-ordering could be implemented if this assumption proves false.

Multicast Support—Sequence number spaces are maintained per-slot in order to facilitate multicasting.

Separate control and data PPX interconnects effectively isolate reliable control traffic from data traffic.

Figure 5:
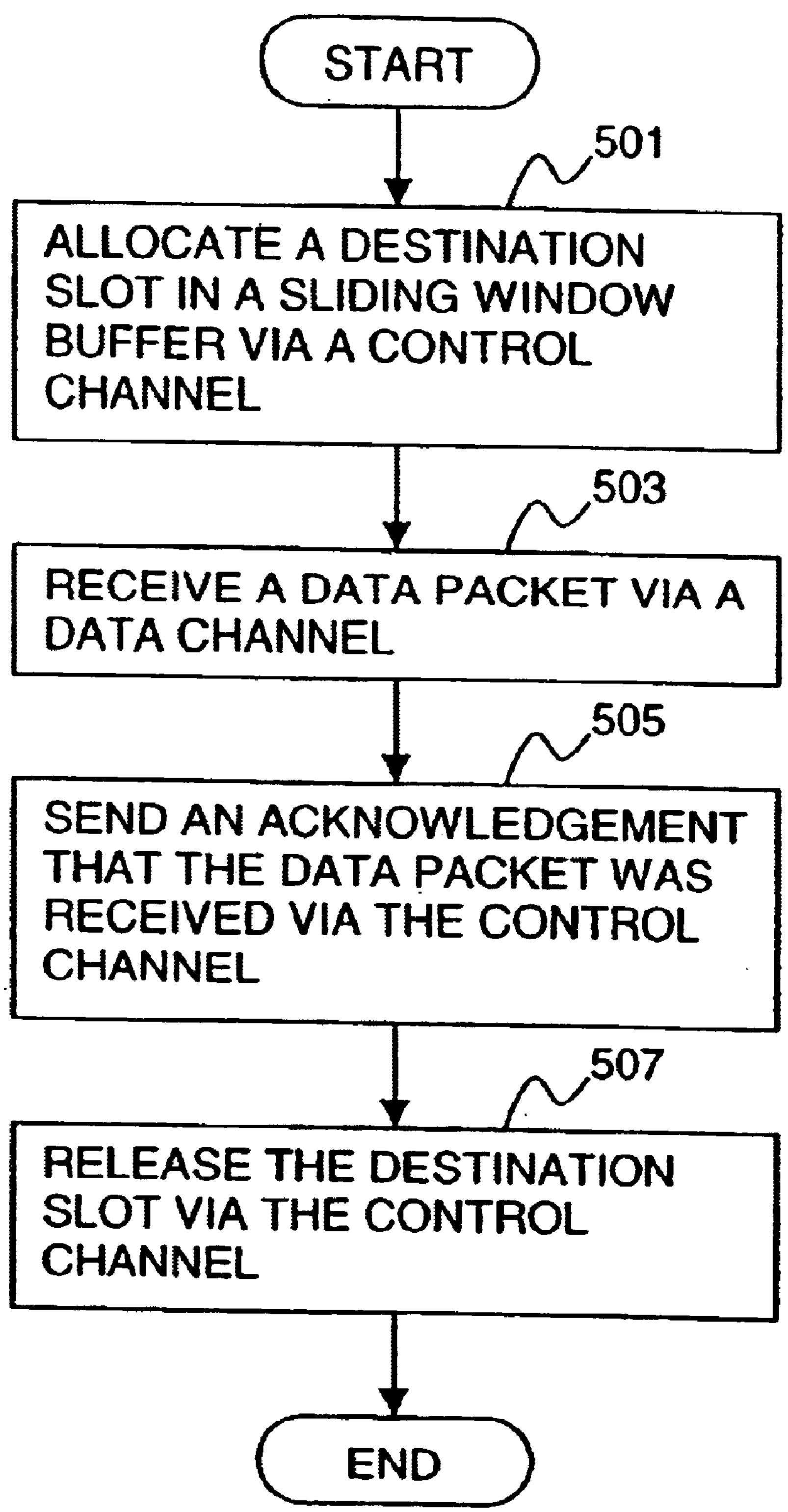
FIG. 5 is a flowchart of a method for the prioritization of control plane traffic in a router compatible with the present invention.

FIG. 5 shows a flow chart of a method for the prioritization of control plane traffic in a router. At step 501, a destination slot is allocated in a sliding window buffer via a control channel. At step 503, a data packet is received via a data channel. At step 505, an acknowledgement is sent that the data packet was received via the control channel. At step 507, the destination slot is released via the control channel.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method for routing control plane traffic in a router comprising the steps of:

allocating a destination slot in a sliding window buffer via a control channel;

receiving a data packet via a data channel, the data packet associated with the destination slot;

sending an acknowledgement that the data packet was received via the control channel; and releasing the destination slot via the control channel.

2. The method of claim 1 wherein the step of releasing the destination slot further comprises replenishing a transmission credit.

3. The method of claim 1 wherein the acknowledgement comprises a message selected from the group comprising acknowledgement (ACK) and negative acknowledgement (NAK).

4. An apparatus for routing control plane traffic in a router comprising:

a first incoming data channel;

a control channel;

an access processor engine (APE) logically coupled to the first incoming data channel and the control channel;

a central processing unit (CPU) logically coupled to the APE; and a data bus logically coupled to the CPU.

5. An article of manufacture for use in a computer system to enable routing of control plane traffic in a router, the article of manufacture comprising a computer usable medium having computer readable program code means embodied in the medium, the program code means including one or more instructions for:

causing a computer to allocate a destination slot in a sliding window buffer via a control channel;

causing a computer to receive a data packet via a data channel;

causing a computer to send an acknowledgement that the data packet was received via the control channel; and causing a computer to release the destination slot via the control channel.

6. The article of manufacture of claim 5 wherein the computer readable program code means embodied in the computer usable medium for causing a computer to release the destination slot further comprises one or more instructions for causing a computer to replenish a transmission credit.

7. The article of manufacture of claim 5 wherein the acknowledgement comprises a message selected from the group comprising acknowledgement (ACK) and negative acknowledgement (NAK).

8. The method of claim 1 wherein only a limited number of destination slots may be allocated at any one time, and thus restricting the number of data packets that may be attempted to be sent during any particular period.

9. The method of claim 1 wherein the acknowledgement is sent only if the sliding window buffer is capable of receiving the data packet.

10. The apparatus of claim 4 further comprising:

a sliding window buffer, the sliding window buffer communicatively coupled to the data bus, and wherein the CPU an the APE are configured to allocate a destination slot in a sliding window buffer, receive a data packet via the first incoming data channel, the data packet associated with the destination slot, sending an acknowledgement that the data packet was received via the control channel, and releasing the destination slot.

11. The apparatus of claim 10 wherein only a limited number of destination slots may be allocated at any one time.

12. The apparatus of claim 10 wherein the acknowledgement is sent only if the sliding window buffer is capable of receiving the data packet.

13. The article of manufacture of claim 5 wherein only a limited number of destination slots maybe allocated at any one time.

14. The article of manufacture of claim 5 wherein the acknowledgement is sent only if the sliding window buffer is capable of receiving the data packet.

15. A routing system comprising:

a transmitting device including a first data communication port, a first control communication port, and a first processing unit configured to allocate N sending slots, where N is an integer number, associate a first message with a sending slot, transmit the first message out the first data communication port, await receipt of an acknowledgement that the first message was received via the first control communication port, and release the sending slot so that another sending slot may be allocated; and a receiving device including a second data communication port, the second data communication port communicatively coupled to the first data communication port, a second control communication port, the second control communication port communicatively coupled to the first control communication port, and a second processing unit configured to allocate a receiving slot, receive the fist message over the first data communication port, associate the received transmit message with a receiving slot, send an acknowledgement that the message was received via the second control communication port, and release the receiving slot so that another receiving slot may be allocated.

16. The system of claim 15 further comprising:

one or more transmit buffers to store transmit messages at the transmitting device, wherein the sending slot is associated with one of the transmit buffers, and one or more receive buffers to store received messages at the receiving device, wherein the receive slot is associated with one of the receive buffers.

17. The system of claim 15 wherein the first control communication port and the second control communication port are dedicated to carrying control traffic.

18. The system of claim 15 wherein only N receiving slots maybe allocated at any one time.

19. The system of claim 15 wherein the receiving device allocates the receiving slot when instructed by the transmitting device.

20. The system of claim 15 wherein the receiver device sends an acknowledgement only if it is capable of receiving additional messages.

* * * * *